United States Patent
Sirkar et al.

(10) Patent No.: US 9,988,956 B2
(45) Date of Patent: Jun. 5, 2018

(54) SYSTEM AND METHOD FOR CONTINUOUS REMOVAL OF WATER FROM OIL VIA MEMBRANE SEPARATION

(75) Inventors: Kamalesh K. Sirkar, Bridgewater, NJ (US); Li Yang, Southampton, PA (US)

(73) Assignee: New Jersey Institute of Technology, Newark, NJ (US)

( * ) Notice: Subject to any disclaimer, the term of this patent is extended or adjusted under 35 U.S.C. 154(b) by 772 days.

(21) Appl. No.: 13/978,333

(22) PCT Filed: Jan. 13, 2012

(86) PCT No.: PCT/US2012/021287
§ 371 (c)(1),
(2), (4) Date: Oct. 10, 2013

(87) PCT Pub. No.: WO2012/097279
PCT Pub. Date: Jul. 19, 2012

(65) Prior Publication Data
US 2014/0021099 A1    Jan. 23, 2014

Related U.S. Application Data

(60) Provisional application No. 61/433,059, filed on Jan. 14, 2011.

(51) Int. Cl.
*F01M 11/03* (2006.01)
*F01M 1/10* (2006.01)
(Continued)

(52) U.S. Cl.
CPC .............. *F01M 11/03* (2013.01); *F01M 1/10* (2013.01); *F16N 39/06* (2013.01); *F01M 2013/0477* (2013.01)

(58) Field of Classification Search
CPC combination set(s) only.
See application file for complete search history.

(56) References Cited

U.S. PATENT DOCUMENTS

| 5,858,385 A | * | 1/1999 | Sirkar | .................... A01N 25/34 424/406 |
| 2002/0100726 A1 | * | 8/2002 | Spearman | .............. B01D 17/04 210/640 |

(Continued)

OTHER PUBLICATIONS

Gan et al. ("Highly porous regenerated cellulose hydrogel and aerogel prepared from hydrothermal synthesized cellulose carbamate." PLoS One, Mar. 15, 2017).*

(Continued)

*Primary Examiner* — Krishnan S Menon
*Assistant Examiner* — Ryan B Huang
(74) *Attorney, Agent, or Firm* — Gearhart Law LLC

(57) ABSTRACT

An oil circulation system and method for continuously purifying engine oil including an engine operably connected to an oil reservoir, wherein at least one stream of oil is conveyed from the oil reservoir to the engine via a conduit, and circulated through the engine and conduit via engine operating pressure and/or one or more pumps, and at least one membrane unit positioned in a path of the oil stream such that oil containing dissolved/emulsified droplets of water is fed continuously through the membrane unit. A cross flow hollow fiber module adapted to be positioned in a system for continuously purifying engine oil, the hollow fiber module having a central feed distributor tube, hollow fiber membranes positioned around the central feed distributor tube, end caps with ports for receiving and emitting a flow of sweep air, and optionally a shell casing, wherein the central feed distributor tube includes openings sized and positioned to allow oil to flowing into the feed distributor tube to flow out radially.

5 Claims, 11 Drawing Sheets

(51) Int. Cl.
*F16N 39/06* (2006.01)
*F01M 13/04* (2006.01)

(56) References Cited

U.S. PATENT DOCUMENTS

| | | | |
|---|---|---|---|
| 2004/0222156 A1* | 11/2004 | Yu | B01D 17/0211 210/650 |
| 2011/0062082 A1* | 3/2011 | Mordukhovich | B01D 61/58 210/651 |
| 2014/0021099 A1 | 1/2014 | Sirkar | |

OTHER PUBLICATIONS

Hlavacek, M. Break-up oil-in-water emulsions induced by permeation through a microfiltration membrane, J. Membr. Sci., 102 (1995) 1-7.

Sun, D. et al.,Demulsification of water-in-oil emulsion by using porous glass membrane, J. Membr. Sci., 146 (1998) 65-72.

Kocherginsky, et al., Demulsification of water-in-oil emulsions via filtration through a hydrophilic polymer membrane, J. Membr. Sci., 220 (2003) 117-128.

Keurentjes, J. T. F. et al., The removal of fatty acids from edible oil; Removal of the dispersed phase of a water-in-oil dispersion by a hydrophilic membrane, Sep. Sci. Technol., 26(3) (1991) 409-423.

Tirmizi, et al., Demulsification of Water/oil/solid emulsions by hollow-fiber membranes, AIChE J., 42 (5) (1996) 1263-1276.

Kukizaki, M.; Goto M. Demulsification of water-in-oil emulsions by permeation through shirasu-porous-glass (SPG) membranes, J. Membr. Sci.,322 (2008) 196-203.

Majumdar et al., Fuel oil desalting by hydrogel hollow fiber membrane, J. Membr. Sci.,202 (2002) 253-256.

Wilke, C.R. and P. Chang, Correlation of diffusion coefficients in dilute solutions, AIChE J., I (1955) 264-270.

* cited by examiner

RC membrane
—△— 0.9 g/ml (Module #6)
—○— 1.4 g/ml (Module #6)
—◇— 2.1 g/ml (Module #7)

SYSTEM AND METHOD FOR CONTINUOUS REMOVAL OF WATER FROM OIL VIA MEMBRANE SEPARATION

FIELD OF THE INVENTION

The present invention relates to the field of membrane separation.

BACKGROUND OF THE INVENTION

Atmospheric moisture as well as water produced by gasoline engine combustion condense in engine oil and introduce a significant amount of water. This water affects the oil performance.

To illustrate the problem, condensation of moisture from atmosphere into oil in colder climates leads to as much as 5-16% water emulsified as droplets in oil. An additional source of water is that obtained as a by-product of gasoline engine combustion. The presence of water changes the performance level of the oil. Further the oil temperature will change from subzero (depending on the ambient conditions) to as much as 100° C. as the engine/machine continues to run. Changes in water including vaporization will introduce complications which could lead to chemical reactions and/or oil degradation.

Thus, it would be useful to provide an onboard oil-water separation device and/or method to reduce the water content in oil to an appropriate level (a few tenths of a percent or less). While the issue of water-emulsified fuel is extremely prevalent in automobiles, certainly any engine or machine utilizing internal combustion and oil would benefit from a water filtration system of this type as water is a by-product of any gasoline combustion process.

SUMMARY OF THE INVENTION

In accordance with one embodiment a hollow fiber membrane device is provided for water removal from an engine/machine utilizing oil. Membrane-based devices described herein continuously purify engine/machine oil by removal of any moisture/water that has accumulated or is accumulating. Other industrial machines using oil for lubrication may also have water which may be removed by the presently disclosed systems and methods.

In another embodiment a system is provided for continuously purifying engine/machine oil by removal of any moisture/water that has accumulated or is accumulating. Such a system is in one embodiment an oil circulation system for continuously purifying engine oil having an engine operably connected to an oil reservoir, wherein at least one stream of oil is conveyed from the oil reservoir to the engine via a conduit, and circulated through the engine and conduit via engine operating pressure and/or one or more pumps, and at least one membrane unit positioned in a path of the oil stream such that oil containing dissolved/emulsified droplets of water is fed continuously through the membrane unit. Systems in accordance with the presently disclosed subject matter may employ one or more fiber membrane units operable to remove water from oil.

In accordance with at least one embodiment, dissolved/emulsified water is removed from engine/machine oil using a membrane unit in the pervaporation mode using sweep air on the opposite side. In one embodiment, a vacuum may be employed instead of sweep air. Embodiments utilizing a vacuum may be useful in stationary machines.

Embodiments disclosed herein may utilize but are not limited to the following hollow fibers: regenerated cellulose (RC), cellulose acetate (CA) and cellulose triacetate (CTA). Hydrogel membranes, such as RC membranes (for example, Cuprophan®) are desirable because potential wetting of pores by oil is essentially eliminated and the water in the hydrogel structure cannot be displaced by the oil unless the oil phase pressure is considerably high.

In accordance with a further embodiment the membrane unit is a cross flow hollow fiber module including a central feed distributor tube, hollow fiber membranes positioned around the central feed distributor tube, end caps with ports for the flow of sweep air, and optionally a shell casing. The central feed distributor tube includes small holes to allow the oil to flow out radially on the shell side. Sweep air may be introduced into the bore of the hollow fibers in the tube side to remove permeated water vapor. A cross flow hollow fiber module may include any number of hollow fiber membranes that may be contained in a shell casing.

In one embodiment a membrane unit is provided having from about 100 to about 1,000 hollow fiber membranes, the fibers having a length of from about 1 to about 20 inches.

In another embodiment a membrane unit is provided having from about 1,000 to about 10,000 hollow fiber membranes, the fibers having a length of from about 1 to about 100 inches.

In still another embodiment a membrane unit is provided having from about 10,000 to about 100,000 hollow fiber membranes, the fibers having a length of from about 1 to about 200 inches.

In yet another embodiment a membrane unit is provided having from about 100,000 to about 1,000,000 hollow fiber membranes, the fibers having a length of from about 1 to about 200 inches.

Furthermore, a method is provided for continuously purifying engine oil in a system comprising an engine operably connected to an oil reservoir, wherein at least one stream of oil is conveyed from the oil reservoir to the engine via a conduit, and circulated through the engine and conduit via engine operating pressure and/or one or more pumps, the method including positioning at least one membrane unit comprising hollow fiber membranes in a path of the oil stream such that oil containing dissolved/emulsified droplets of water is fed continuously through the membrane unit. The method may include introducing sweep air into a bore of the hollow fiber membranes to remove permeated water vapor.

For membrane demulsification processes using porous membranes, the membrane acts as a wetting and a coalescing medium; the break-up of the emulsion droplets permeated through porous membranes occurs by adsorption of the droplets onto the pore wall and subsequent coalescence of the resultant droplets in the pores. The separation process is not based on sieving effects due to a difference in membrane pore size, but is determined by droplet and membrane surface interactions. See, Hlavacek, M. Break-up oil-in-water emulsions induced by permeation through a microfiltration membrane, J. Membr. Sci., 102 (1995) 1; Sun, D. et al., Demulsification of water-in-oil emulsion by using porous glass membrane, J. Membr. Sci., 146 (1998) 65; Kocherginsky, et al., Demulsification of water-in-oil emulsions via filtration through a hydrophilic polymer membranes, J. Membr. Sci., 220 (2003) 117; Keurentjes, J. T. F. et al., The removal of fatty acids from edible oil; Removal of the dispersed phase of a water-in-oil dispersion by a hydrophilic membrane, Sep. Sci. Technol., 26 (1991) 409, each of which is incorporated by reference in its entirety.

Separation of inverted water-in-oil (w/o) emulsions was reported in Kocherginsky, et al., supra; Tirmizi, et al., J. Demulsification of water/oil/solid emulsions by hollow-fiber membranes, AIChE J., 42 (1996) 1; and Kukizaki, M.; Goto M. Demulsification of water-in-oil emulsions by permeation through shirasu-porous-glass (SPG) membranes, J. Membr. Sci., 322 (2008) 196, each of which is incorporated by reference in its entirety. Kocherginsky et al., supra, employed different hydrophilic polymer membranes to preferentially permeate water from w/o emulsion. Majumdar et al., Fuel oil desalting by hydrogel hollow fiber membrane, J. Membr. Sci., 202 (2002) 253, incorporated herein by reference, had studied earlier fuel oil desalting from w/o emulsions containing 4 vol % water using a hydrophilic Cuprophan® hollow fiber hydrogel membrane.

However, no membrane unit and/or circulation system employing such a unit has been provided which continuously purifies engine/machine oil by removal of any moisture/water that has accumulated or is accumulating.

BRIEF DESCRIPTION OF THE DRAWINGS

So that those having ordinary skill in the art will have a better understanding of how to make and use the disclosed systems and methods, reference is made to the accompanying figures wherein.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
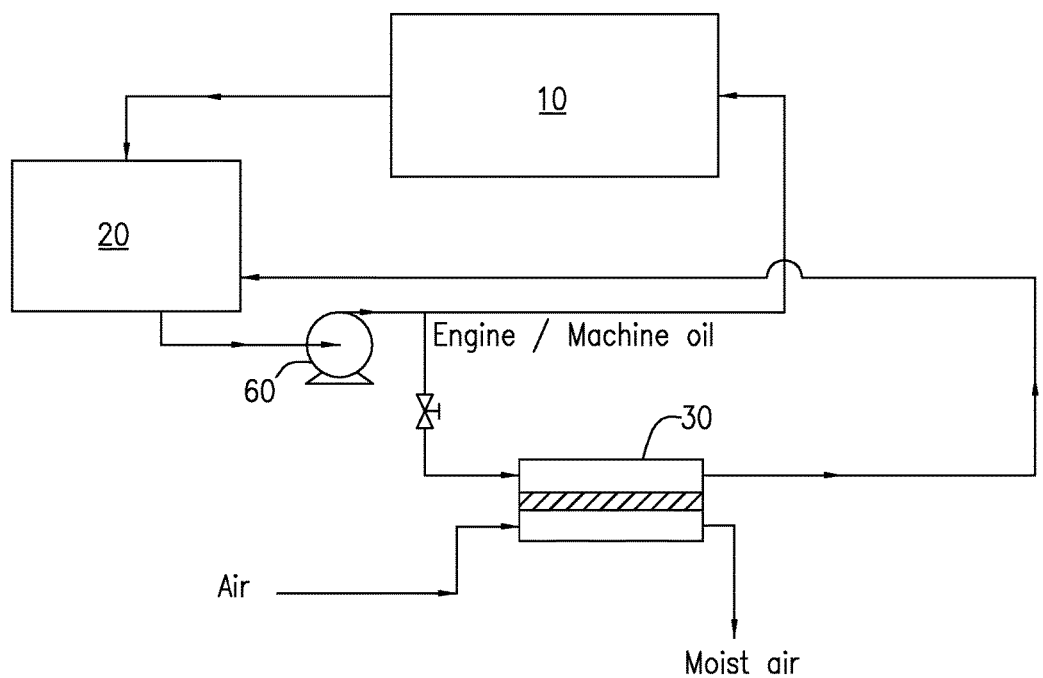
FIG. 1 depicts a schematic of a system for removal of water from machine oil by sweep air with bypass in accordance with one embodiment of the present disclosure.
Figure 2:
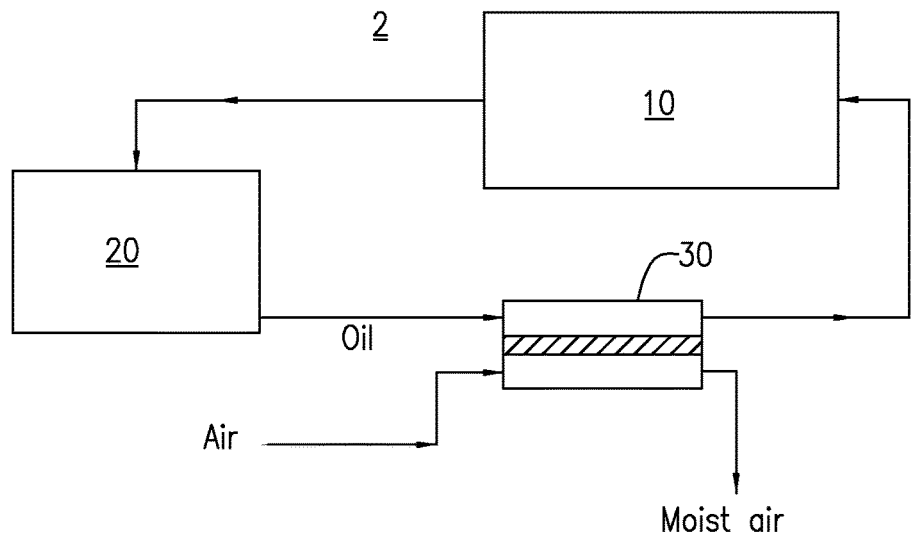
FIG. 2 depicts a schematic of a system for removal of water from machine oil by sweep air without bypass in accordance with one embodiment of the present disclosure.
Figure 3:
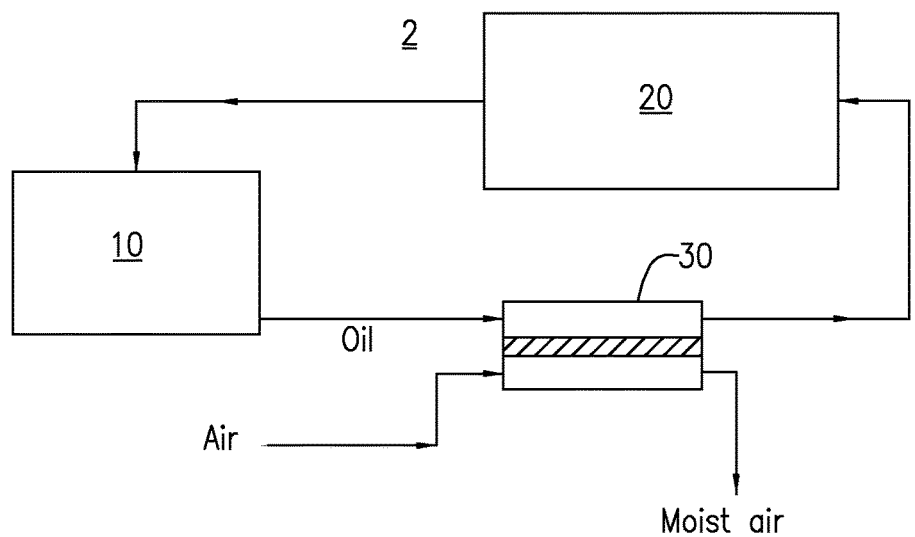
FIG. 3 depicts a schematic of a system for removal of water from machine oil by sweep air without bypass in accordance with one embodiment of the present disclosure.

Now referring to FIGS. 1-3, embodiments of an oil circulation system 2 include an engine/machine 10 operably connected to an oil reservoir 20, membrane unit 30 and optionally one or more pumps 60. In accordance with these embodiments, a stream of oil containing dissolved/emulsified droplets of water is fed continuously through the membrane unit 30 to the rest of the oil circulation system 2 as long as the automobile/engine is running, or there is an external means such as a pump for circulating oil. The membrane unit 30 removes a fraction of the water in each pass, and within a reasonable period of time, the water content in the oil is substantially reduced even when there is a significant amount of water in the oil at the beginning of circulation. Continuous circulation and passes through the membrane 30 operates to remove any small amount of moisture that may be introduced to the oil and prevent accumulation of a large amount of water.

The membrane unit 30 may be placed directly in the oil circulation pathway, as shown in FIGS. 2 and 3, or can be introduced to the pathway as a bypass (FIG. 1), depending on the type and size of the membrane unit 30 employed in a particular embodiment. For example, a parallel or crossflow membrane unit 30 may be employed, and membrane units 30 of various diameter may be employed. The number of fibers, length of fibers, and/or surface area of a membrane unit 30 may dictate the location of the membrane unit 30 in the circulation system 2. The system of FIG. 1 may be modified utilizing the membrane unit/bypass in any combination or orientation with respect to both the oil reservoir 20 and engine/machine 10.

The membrane unit 30 preferably employs membranes with resistance to oil wetting. Hydrophilic porous membranes may result in the membrane pores becoming wetted with oil. The displacement pressure to remove water by oil would not be high for larger pores in the range of 0.02-0.2 µm. Tirmizi, N. P.; Raghuraman, B.; Wienck, J. Demulsification of water/oil/solid emulsions by hollow-fiber membranes, AIChE J., 42 (1996) 1. Hydrogel membranes, such as regenerated cellulose membranes (for example, Cuprophan®), with effectively no pores are ideal in such an application since the potential wetting of the pores by the oil is essentially eliminated and the water in the hydrogel structure cannot be displaced by the oil unless the oil phase pressure is considerably high. When the water droplets contact the hydrogel surface, the water automatically dissolves/partitions into the hydrogel and is removed.

In accordance with at least one embodiment, dissolved/emulsified water is removed from engine/machine oil using membrane unit 30 in the pervaporation mode using sweep air on the opposite side. In one embodiment, a vacuum (not shown) may be employed instead of sweep air. Embodiments utilizing a vacuum may be useful in stationary machines. Sweep air may also be introduced to the system by other means, such as an air intake of an automobile, with or without a device for forced air induction (similar to a supercharger), or turbocharger.

Embodiments of the present invention may utilize but are not limited to the following hollow fibers: regenerated cellulose (RC), cellulose acetate (CA) and cellulose triacetate (CTA). Commercially available membranes that may be employed in membrane unit 30 include for example CUPROPHAN®, CA, CTA, and PUREMA® L membranes. The membrane unit 30 may include a shell casing formed of polypropylene (PP), stainless steel, etc.

In one embodiment, membrane unit 30 includes a hollow fiber membrane, such that in circulation system 2, oil containing emulsified water flows on one side of the hollow fiber membrane. Air flowing on the other side of the hollow fiber membrane strips the moisture from the oil through a hydrogel membrane present in the hollow fiber membrane wall (FIG. 1).

Figure 4:
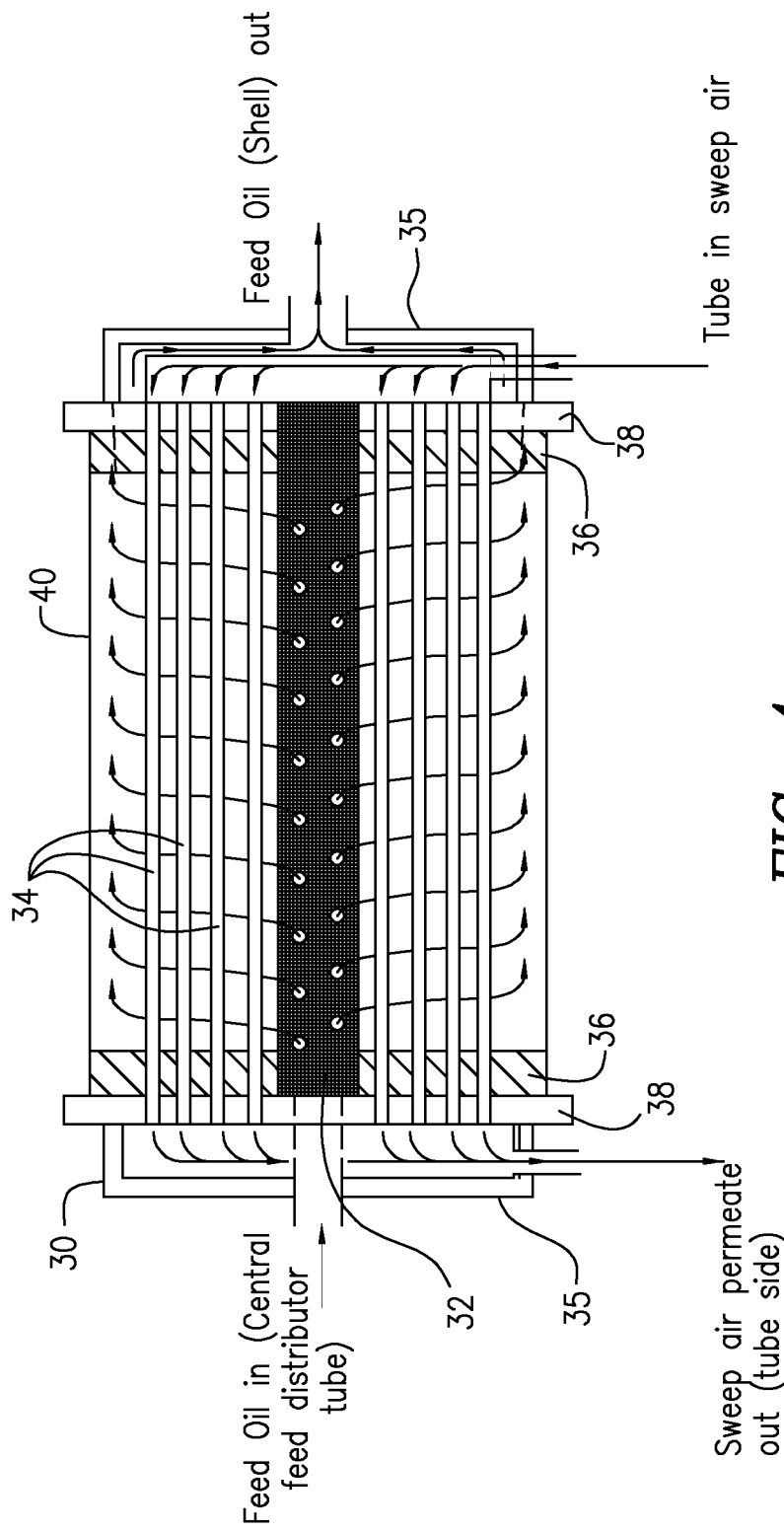
FIG. 4 is a schematic depiction of a cross flow module employing hollow fiber membranes in accordance with one embodiment of the present disclosure.

Now referring to FIG. 4, in one embodiment the membrane unit 30 is a cross flow hollow fiber module including a central feed distributor tube 32, hollow fiber membrane 34, end caps 35 with ports for the flow of sweep air, plugs 36, sleeve joint 38 and optionally a shell casing 40. Central feed distributor tube 32 is essentially an interior central feed containing small holes to allow the oil to flow out radially on the shell side. Sweep air may be introduced into the bore of fibers 34 in the tube side to remove permeated water vapor. A suitable cross flow hollow fiber module may include any number of hollow fiber membranes 34 that may be contained in shell casing 40. For example, approximately 300 RC hollow fiber membrane fibers may be placed between a ¾" shell casing 40 (outside tube) and a ¼" central feed distributor tube (inside tube). Those having ordinary skill in the art will recognize that shells 40 and tubes 32 may be sized for an appropriate task, and contain a greater or lesser number of membrane fibers 34. It will be apparent that systems and membranes in accordance with the present disclosure may be employed in conjunction with small engines, for example, those used in lawnmowers, gas-powered trimmers, etc, to larger engines, such as automobiles, to massive installations such as large generators, ship engines and the like. Accordingly, membrane units may include any number of hollow fiber membranes, of any suitable dimension. For example, for smaller applications, a smaller number of membrane fibers, for example, 10-100, having a length of from about 1 inch to about 10 inches may be adequate. In another embodiment a membrane unit may include from about 1,000 to about 10,000 hollow fiber membranes, the fibers having a length of from about 1 to about 100 inches. In another embodiment a membrane unit may include from about 10,000 to about 100,000 hollow fiber membranes, the fibers having a length of from about 1 to about 200 inches. In yet another embodiment a membrane unit may include from about 100,000 to about 1,000,000 hollow fiber membranes, the fibers having a length of from about 1 to about 200 inches.

Examplary, non-limiting characteristics of a cross flow hollow fiber module are listed in Table 3 below.

Testing of exemplary embodiments utilized SAE 5W30 motor oil containing emulsified water at the level of 1-4% by weight for comparison sake, however any other type/weight of motor oil would work within multiple embodiments of the proposed invention. Batch recirculation studies demonstrated greater than 90% removal of emulsified water in an embodiment of a parallel flow module containing 300 regenerated cellulose (RC) capillaries having a surface area of 150 $cm^2$. Studies were successfully carried out over a range of temperatures, oil flow rates, water content and oil temperature ramping with the oil flowing through the bore of hollow fiber membranes and air flowing outside. Multiple embodiments of the present invention utilized a cross flow hollow fiber system with the engine oil flowing outside the fibers in cross flow which showed no membrane fouling on repeated use. A mathematical model was developed to extract water mass transfer coefficient from the experimental data. Embodiments utilizing a cross flow system have been shown to be able to remove moisture effectively in an automobile.

Exemplary Embodiments

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed.

A number of exemplary embodiments were created based on based on CUPROPHAN®, CA, CTA, and PUREMA® L, including small modules with the fibers potted without the shell in order to visually check the oil resistance of the fibers. One embodiment utilizes stainless steel membrane modules. Said modules contained approximately 200 to approximately 300 hollow fibers, however a wider range of fibers is embraced by further embodiments. For one particular stainless steel module embodiment, the module shell consisted of a ⅜" stainless steel tube (McMaster-Carr, Robbinsville, N.J.) with a ⅜" street tee (Swagelok, Mountainside, N.J.) at both ends. Two layers of potting were prepared at each end of said embodiment where the street tee was connected using Armstrong resin A and C-4 epoxy respectively. The characteristics of the hollow fibers and the specifications of the modules are listed in Table 2.

TABLE 1

Details of hollow fiber membrane embodiments

| Membrane | Wall thickness (μm) | Inner diameter (μm) | Mean pore diameter (nm) | Cut-off (kD) |
|---|---|---|---|---|
| CUPROPHAN (RC) | 8 | 200 | N/A | 9 |
| CA (Cellulose acetate) | 15 | 200 | 7.6 | |
| CTA (Cellulose triacetate) | 15 | 200 | 14.6 | |
| PUREMA ® L | 35 | 200 | | 15 |

TABLE 2

Characteristics of the stainless steel shell-based hollow fiber module membrane embodiments Fiber characteristics

| Fiber type | CA | | CTA | | RC | |
|---|---|---|---|---|---|---|
| Manufacturer | Toyobo Corp., Japan | | Toyobo Corp., Japan | | Membrana/Celgard, Wuppertal, Germany | |
| Fiber inner diameter, (μm) | 200 | | 200 | | 200 | |
| Fiber wall thickness, (μm) | 15 | | 15 | | 8 | |
| Mean pore diameter, (nm) | 7.6 | | 14.6 | | N/A | |
| Effective fiber length, (cm) | 8 | | 8 | | 8 | |
| Fiber potting material | C4 epoxy | | C4 epoxy | | C4 epoxy | |
| Module characteristics | | | | | | |
| Module type | CA | | CT | | RC | |
| Module number, # | 1 | 3 | 5 | 2 | 4 | 6 | 7 |
| Number of fibers | 200 | 300 | 300 | 200 | 300 | 300 | 300 |
| Module length, (cm) | 16 | | 16 | | 16 | |
| Shell inner diameter, (cm) | 1.25 | | 1.25 | | 1.25 | |
| Active surface area (cm$^2$)* | 100.5 | 150.7 | 150.7 | 100.5 | 150.7 | 150.7 | 150.7 |

*Based on inside diameter

A cross flow hollow fiber module in accordance with FIG. 4 was made having approximately 300 RC hollow fibers placed between a ¾" nylon tube (outside tube) and a ¼" PTFE tube (inside tube) containing small holes to allow the oil to flow out radially on the shell side. The characteristics of this cross flow hollow fiber module are listed in Table 3. Sweep air was introduced into the bore of fibers in the tube side to remove permeated water vapor.

TABLE 3

Characteristics of the cross flow hollow fiber module

| Fiber type* | Regenerated cellulose (RC) |
|---|---|
| Fiber inner diameter (μm) | 200 |
| Fiber wall thickness (μm) | 8 |
| Mean pore diameter (nm) | N/A |
| Number of fibers | 300 |
| Effective length (cm) | 16 |
| Active surface area (cm$^2$)** | 301.60 |
| Shell details | ¾" O.D. nylon tube having a centrally placed coaxial ¼" O.D. PTFE tube with some small holes; hollow fibers were placed between these tubes |

Figure 5:
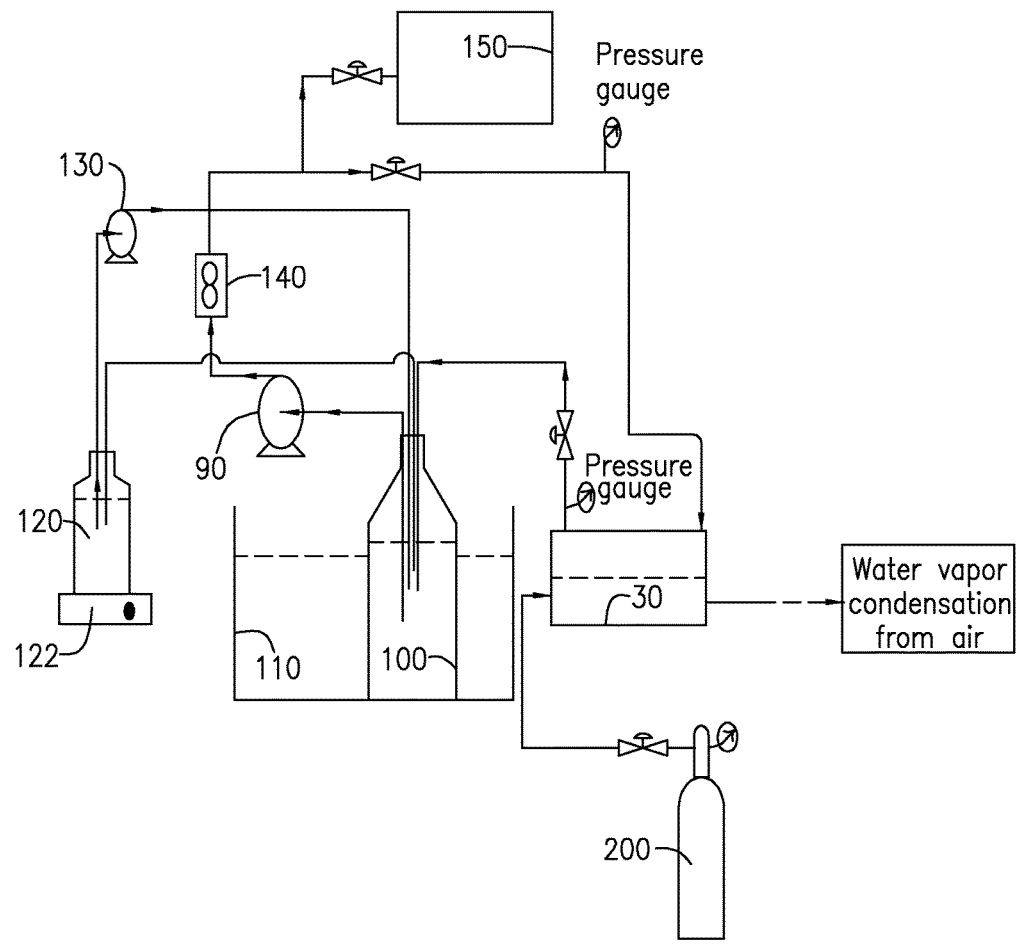
FIG. 5 is a schematic depiction of an experimental set up for removal of water from engine oil in accordance with one embodiment of the present disclosure.
Figure 6:
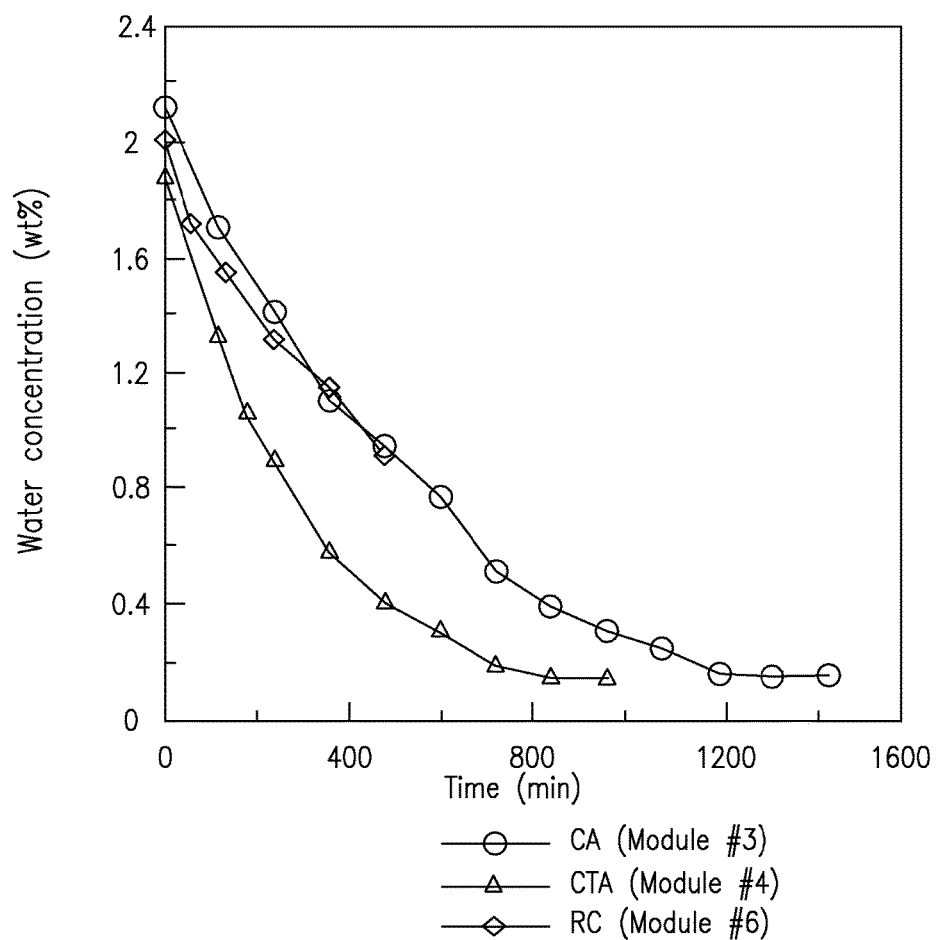
FIG. 6 is a graph of effect of membrane type on water removal; Initial water content $C_0$=1.9-2.1 wt %; T=65.5° C.; Oil flow rate: 1.35-1.60 g/min; Air flow rate: 100 cm$^3$/min.
Figure 7:
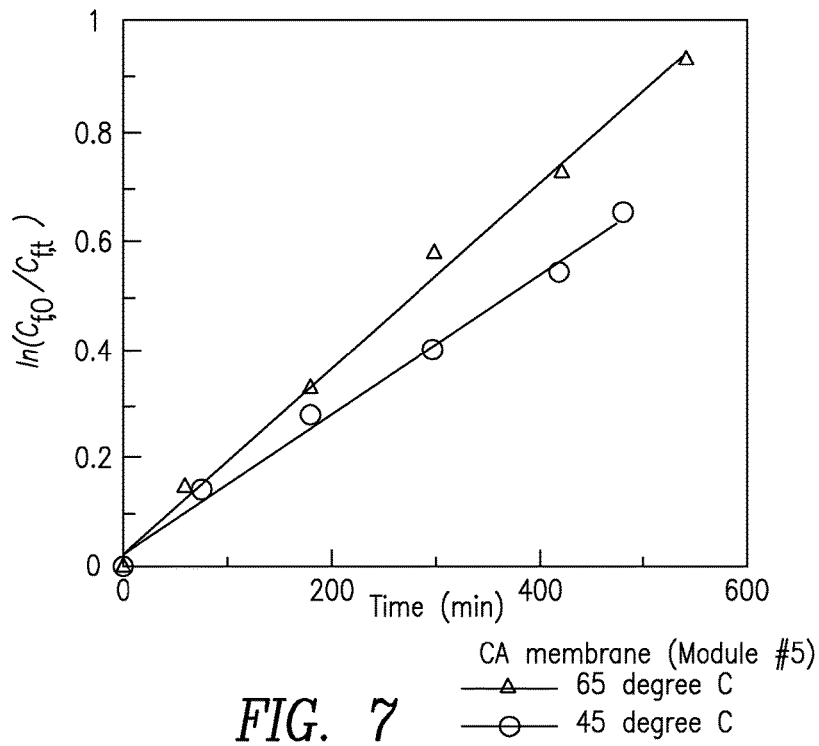
FIG. 7 is a graph of effect of temperature on water removal for CA membrane; $C_0$=1.8-1.9 wt %; Oil flow rate: 1.35-1.6 g/min; Air flow rate: 100 cm$^3$/min.

*Manufactured by Membrana/Celgard, Wuppertal, Germany; Provided by Baxter Healthcare, Round Lake, IL
**Based on inside diameter Now referring to FIG. 5, an experimental setup was created for testing of efficacy of embodiments of the disclosed subject matter. Water-in-oil emulsion was prepared by dispersing the desired amount of water in SAE 5W 30 motor oil (Valvoline) through sonication followed by continuous stirring. Again, any weight/type of oil could be utilized in the inventive system. The emulsion was pumped by an ISMATEC gear pump 90 (Model ISM446A, Cole-Parmer, Vernon Hills, Ill.) from the oil reservoir 100 through the bore side of the membrane unit 30 in the continuous recirculation mode. The oil reservoir 100 was placed in a thermostat 110 (Model 12111-21, Cole-Parmer); the temperature of the liquid surrounding the oil reservoir 100 could be ramped up or down in a continuous fashion. To prevent demulsification, a recirculation reservoir 120 with a magnetic stirrer 122 was located outside oil reservoir 100. In the experimental setup the oil volume of the recirculation reservoir was about 150 ml, while the oil volume in the reservoir 100 was about 250 ml. An additional gear pump (Easy load, Cole-Parmer) 130 was used to continuously circulate the oil emulsion between reservoir 120 and oil reservoir 100.

Air from a dry compressed air cylinder 200 was used as sweep gas through the shell side of the membrane unit 30 in a once-through mode exiting at essentially atmospheric pressure. The temperature of the system was managed by wrapping a heating cord (Cole-Parmer), controlled by a Powerstat variable autotransformer (Superior Electric Co., Farmington, Conn.), around the tube line and the membrane unit 30. The fluid temperature at the membrane unit 30 inlet was measured by a thermocouple (Cole-Parmer) with ±0.1° C. accuracy. The flow rate of the air was controlled at 100 cm$^3$/min and the oil recirculation rate as measured by rotameter 140 was varied from 1.3 to 2.3 g/min in parallel flow modules to maintain the module inlet pressure less than 15 psig. In cross flow modules, the oil maximum flow rate used was ~25 g/min.

The water content in the oil collected in container 150 was measured as a function of time using a DL 18 Karl Fisher Titrator (Mettler-Toledo Inc., Columbus, Ohio). Commercial solvents, such as Aquastar CombiSolvent Oils and Aquastar CombiSolvent Crude Oils, could not be used since the SAE 5W30 oil did not dissolve in such a solvent. Other solvents (chloroform, toluene, xylene) were mixed with methanol and their composition optimized. The results showed that the toluene and methanol blends in the ratio of 4:1 were well suited for the Karl Fisher (KF) analysis of water in SAE 5W30 oil. The 1% water standard was used for the verification of the analysis. The conditions of the experiments are listed in Table 4 unless mentioned otherwise. Specifically the oil flow rate could be increased easily by as much as ten times with the cross flow module.

TABLE 4

| Experimental conditions Feed solution | |
|---|---|
| Water content (wt %) | 1-4.5 |
| Flow rate (g/min) | 1.0-2.3 |
| Volume (ml) | 250 |
| Temperature (° C.) | 25-80 |
| Sweep air | |
| Flow rate (cm³/min) | 100 |

In addition to constant temperature experiments, programmed temperature rampings/variations, the programmed temperature ramp was designed for two different conditions, cold and warm weathers. For the cold weather, the initial condition of cold temperature was started at −10° C. for 1 hour, then raised to 65° C. as fast as possible and kept at that temperature for at least 5 hours. The warmer ramp temperature condition was started at 22° C. for 1 hour, then raised to 80° C. as fast as possible and kept at that temperature for at least 5 hours. Faster rise in temperature of the bath could not be implemented even though it was programmed for it.

In multiple exemplary embodiments, oil from the oil reservoir is pumped through the bores of the hollow fibers. A sweep air stream is blown on the other side to remove the moisture permeated through the membrane. The overall mass transfer coefficient is determined from a simple plot using the concentration versus time data. The model is valid for embodiments of the present invention utilizing cross flow as well as batch mode.

In certain exemplary embodiments of the present invention, mass transfer of the water from the feed to the other side of membrane takes place in three steps: (i) diffusion of water in the feed oil solution to the feed-membrane interface through the liquid boundary layer; (ii) diffusion of water through the membrane and (iii) diffusion of water in the gas phase. For said embodiment, the mass flux of water through the feed phase boundary layer, N, can be expressed as:

$$N = k_f (C_f - C_{fi}) \quad (1)$$

where $k_f$ is the feed side water mass transfer coefficient, $C_f$ and $C_{fi}$ are the water concentrations in the bulk and at the feed-membrane interface, respectively. The water flux through the hollow fiber membrane wall of certain exemplary embodiments is expressed by the following equation:

$$N = k_m (C_{fi} - C_{gi}) \quad (2)$$

where $k_m$ is the membrane water transfer coefficient and $C_{gi}$ is the water concentration at the membrane-gas interface on the permeate/sweep air side. The water flux at the gas interface for certain exemplary embodiments is:

$$N = k_g (C_{gi} - C_g) \quad (3)$$

where $C_g$ is the bulk concentration of water in the gas phase and $k_g$ is the water mass transfer coefficient in the gas phase. The flux in certain exemplary embodiments is at steady state and is obtained by combining Eqs. (1)-(3):

$$N = K_f (C_f - C_g) \quad (4)$$

where $K_f$ is the overall water mass transfer coefficient; $K_f$ is related to the individual water mass transfer coefficients by the following equation provided the membrane wall thickness is quite small (otherwise area corrections are needed):

$$\frac{1}{K_f} = \frac{1}{k_f} + \frac{1}{k_m} + \frac{1}{k_g} \quad (5)$$

Under the experimental conditions of certain exemplary embodiments is, $C_g \ll C_f$ leading to the simplification that $$N \approx K_f C_f \quad (6)$$

In certain exemplary embodiments of the present invention, the feed was recirculated through the fiber lumen side. For said embodiments, a set of equations was developed describing (i) the change in solute concentration in the membrane module and (ii) the change in solute concentration in the feed tank. Assuming plug flow in the hollow fiber membrane bores and linear concentration gradients, the equations are written as follows. Mass balance for water (the solute) in the hollow fiber module:

$$-Q \cdot L \cdot \frac{dC_f^M}{dz} = A \cdot K_f \cdot (C_f - C_g) = -Q \cdot L \cdot \frac{dC_f}{dz} \quad (7)$$

$$z = 0, C_f^M = C_{f,z=0}$$

$$z = L, C_f^M = C_{f,z=L}$$

Oil Reservoir Mass Balance for Water:

$$V \cdot \frac{dC_f^T}{dz} = Q \cdot (C_{f,z=L}^M - C_{f,z=0}^M) \quad (8)$$

$$t = 0, C_f^T = C_{f,0}$$

$$t = t, C_f^T = C_{f,t}$$

Here A (cm²) is the effective surface area of the membrane based on I.D.; $C_{f,0}$ (wt %) is the initial solute (water) concentration and $C_{f,t}$ (wt %) is the solute concentration at any time t; L (cm) is the length of the fiber; Q (cm³/min) is the feed flow rate; V (cm³) is the feed tank volume. The superscripts M and T refer to the membrane module and tank, respectively. Under the experimental conditions, $C_g \ll C_f$ leading to the simplification that $$-Q \cdot L \cdot \frac{dC_f^M}{dz} = A \cdot K_f \cdot C_f^M \quad (9)$$

Equation (9) can be integrated to obtain $$\ln \frac{C_{f,z=l}^M}{C_{f,z=0}^M} = -\frac{K_f}{Q} \cdot A \quad (10)$$

Applying the above relationship, Eq. (8) can be integrated to obtain $$\ln \frac{C_{f,0}^T}{C_{f,t}^T} = \left(\frac{Q}{V}\left(1 - e^{-\frac{K_f \cdot A}{Q}}\right)\right) t \quad (11)$$

One can plot $$\ln \frac{C_{f,0}^T}{C_{f,t}^T} \text{ vs. } t; \text{ here } \frac{C_{f,0}^T}{C_{f,t}^T}$$

is the same as $$\frac{C_{f,0}}{C_{f,t}};$$

the slope of the plot can be equated to $$\left(\frac{Q}{V}\left(1 - e^{-\frac{K_f \cdot A}{Q}}\right)\right)$$

which allows us to obtain the value of the overall mass transfer coefficient, $K_f$, since Q, V and A are known.

The tube side liquid mass transfer coefficient $k_f$ for tube-side oil flow can be calculated from the well-known Lévêque solution (Lévêque, X. Les Lois de la transmission de chaleur par conduction, Ann. Mines, 13, (1928) 201), which is valid for laminar flow:

$$Sh = \frac{k_f d_i}{D_f} = 1.615 \left(\frac{d_i^2 v}{L D_f}\right)^{1/3} \quad (12)$$

Here $d_i$ (cm) is the inner diameter of the fiber; $D_f$ (cm²/s) is the diffusion coefficient of water in the liquid (oil) phase; v (cm/s) is the liquid flow velocity. The water diffusion coefficient in oil was estimated using the Wilke-Chang equation (Wilke, C. R. and P. Chang, Correlation of diffusion coefficients in dilute solutions, AIChE J., 1 (1955) 264):

$$D_{AB} = \frac{7.4 \times 10^{-8} (\phi M_B)^{1/3} T}{\eta_B V_A^{0.6}} \quad (13)$$

where
  $D_{AB}$=mutual diffusion coefficient of solute A at very low concentrations in solvent B, cm²/s
  $M_B$=molecular weight of solvent B, g/mol
  T=temperature, K
  $\eta_B$=viscosity of solvent B, cP
  $V_A$=molar volume of solute A at its normal boiling temperature, cm³/mol
  $\phi$=association factor of solvent B, dimensionless.

Certain embodiments of the present invention utilize parallel flow modules where the oil flowed through the fiber bore and air flowed outside. In a further embodiment, a module was utilized where the oil was in cross flow over the outside of the fibers and the air flowed through the fiber bore.

Embodiments tested experimentally were controlled for leakage and oil resistance to assure accuracy in results. The membrane leakage and oil resistance tests were performed by flowing oil through the fiber bores under a pressure less than 15 psig at room temperature or maintaining it at 15 psig with the other end closed and checking the leakage from the shell side if any. The shell side of certain embodiments of the present invention had either sweep air flowing or just stagnant air open to ambient atmosphere. The results are shown in Table 5 (where N=number of fibers, L=effective fiber length) for the smaller PP based modules.

TABLE 5

Summary of test results on various fibers and oil leakage if any

| Membrane | Module | Pretreatment | Shell side | Leakage test |
|---|---|---|---|---|
| Regenerated cellulose-based Cuprophan | No. 1<br>N = 18<br>L = 15 cm | None | Ambient | Oil pressure 3-12 psi. Very small amount of oil was detected from the bottom of the shell side after 3 days, while no leakage from the top side. Put the module up-side down, no leakage from the bottom for 15 days, when lots of oil was detected from the shell side. |
| | No. 8<br>N = 12<br>L = 13.5 cm | None | Sweep air | Oil pressure 5 psi. Oil was detected from the bottom shell side after 2 days. |
| | No. 2<br>N = 12<br>L = 14 cm | Soak in IPA* and air dried, surface roughening of the PP** shell to ensure good bonding with epoxy | Ambient | Oil pressure 8 psi. Oil was detected from the bottom shell side after 1 day. |
| | No. 6T<br>N = 12<br>L = 7 cm | 1. Soak in IPA and air dried<br>2. Soak in H₂O and dried at 55° C. | Sweep air | Oil pressure 5-8 psi, lots of oil was detected from the bottom shell side after 1.5 days. |
| | No. 5<br>N = 18<br>L = 4 cm | No. 1 module cut the shell side and then potted the fiber end | Ambient | No oil was detected outside of the fibers for 14 days for 15 psi oil and the test was stopped. |
| | No. 13<br>N = 8<br>L = 8 cm | Fiber potted without shell | Ambient | No oil was detected outside of the fibers for 11 days for 10 psi oil and the test was stopped. |
| | No. 14<br>N = 12 | Soak in water and air dried | Ambient | Oil pressure of 5-10 psi. No oil detected from the bottom shell side |

TABLE 5-continued

Summary of test results on various fibers and oil leakage if any

| Membrane | Module | Pretreatment | Shell side | Leakage test |
|---|---|---|---|---|
| | L = 11 cm | | | after 20 days and the test was stopped. |
| | No. 19<br>N = 8<br>L = 5 cm | Soak in water and air dried. Fiber potted without shell | Ambient | No oil was detected outside of the fibers for 16 days for 10 psi oil and the test was stopped. |
| CA | No. 3<br>N = 14<br>L = 10 cm | None | Ambient | Oil pressure 5 psi. Small amount of oil was detected from the shell side right away. There may be some damaged fibers. These fibers were obtained by cracking open the shell casing of a large module received from Baxter; the fibers were likely to have been damaged on the surface of the fiber bundle. |
| | No. 7<br>N = 14<br>L = 9 cm | None | Sweep air | Oil pressure 5-15 psi. Very small amount of oil was detected from the bottom of the shell side after 12 days |
| | No. 9<br>N = 14<br>L = 9.5 cm | None | Sweep air | Oil pressure 5-15 psi. No oil was detected from the bottom of the shell side for 14 days and the test was stopped. |
| | No. 11<br>N = 5<br>L = 7 cm | Fiber potted without shell | Ambient | Oil pressure 10 psi. No oil was detected outside of the fibers for 20 days and the test was stopped. |
| | No. 18<br>N = 12<br>L = 5 cm | Fiber potted without shell | Ambient | Oil pressure 10 psi. No oil was detected outside of the fibers for 22 days and the test was stopped. |
| Polyethersulfone-based PUREMA ® L | No. 10<br>N = 14<br>L = 17 cm | None | Sweep air | Oil pressure of 5-10 psi. No oil was detected from the bottom shell side after 9 days and the test was stopped. |
| | No. 12<br>N = 8<br>L = 7 cm | Fiber potted without shell | Ambient | Oil pressure of 5-10 psi. Oil was detected outside of the fibers after 5 days. |
| CTA | No. 15<br>N = 12<br>L = 8.5 cm | None | Ambient | Oil pressure of 5-10 psi. No oil was detected from the bottom shell side after 20 days and the test was stopped. |
| | No. 16<br>N = 14<br>L = 10.5 cm | None | | Potted May 14 |
| | No. 17<br>N = 14<br>L = 7 cm | Fiber potted without shell | Ambient | Oil pressure of 10 psi. Oil was detected outside of the fibers after 1 day. |
| | No. 19<br>N = 14<br>L = 7 cm | Fiber potted without shell | Ambient | Oil pressure of 10 psi. Oil was detected outside of the fibers after 1 day. It was found that the fresh fiber also had some liquid on the fiber outside. The liquid outside of the fiber (Module 19) was wiped off and the test was started again under the oil pressure of 10 psi. No oil was detected after 5 days. |

*IPA—isopropyl alcohol;
**PP—polypropylene

In experimentation, embodiments utilizing polyethersulfone membranes showed poor oil resistance compared to embodiments utilizing CA or Cuprophan.

Oil flow rate was in the range of 1.35-1.60 g/min during testing of exemplary embodiments, with a pressure at hollow fiber bore inlet of 0-11 psig. The oil pressure drop through the fibers could easily be 10-15 psig. Results indicate that water was continuously removed from the oil over a considerable length of time for embodiments utilizing all three membranes investigated. The water removal rates for embodiments utilizing various polymers were in the order of CTA>CA>RC, which is consistent with the pore diameter of the membranes: the larger is the membrane pore diameter, the faster is the rate of water removal. However, the equilibrium water content in the oil phase was almost the same for different membranes. The water content could be reduced from the initial value of 2 wt % to about 0.15 wt % at which time the water removal rate appeared to become negligible.

The overall mass transfer coefficients for embodiments of the present invention utilizing CA, CTA and RC membranes at 65.5° C., respectively, were calculated and the results are shown in Table 6. The fairly high mass transfer coefficients indicate that these membranes are useful for such applications.

TABLE 6

Overall mass transfer coefficient for different membranes at 65.5° C.

| Membrane | Module # | $K_f \times 10^4$ (cm/s) |
|---|---|---|
| CTA | 4 | 1.30 |
| CA | 3 | 0.66 |
| RC | 6 | 0.49 |

Figure 8:
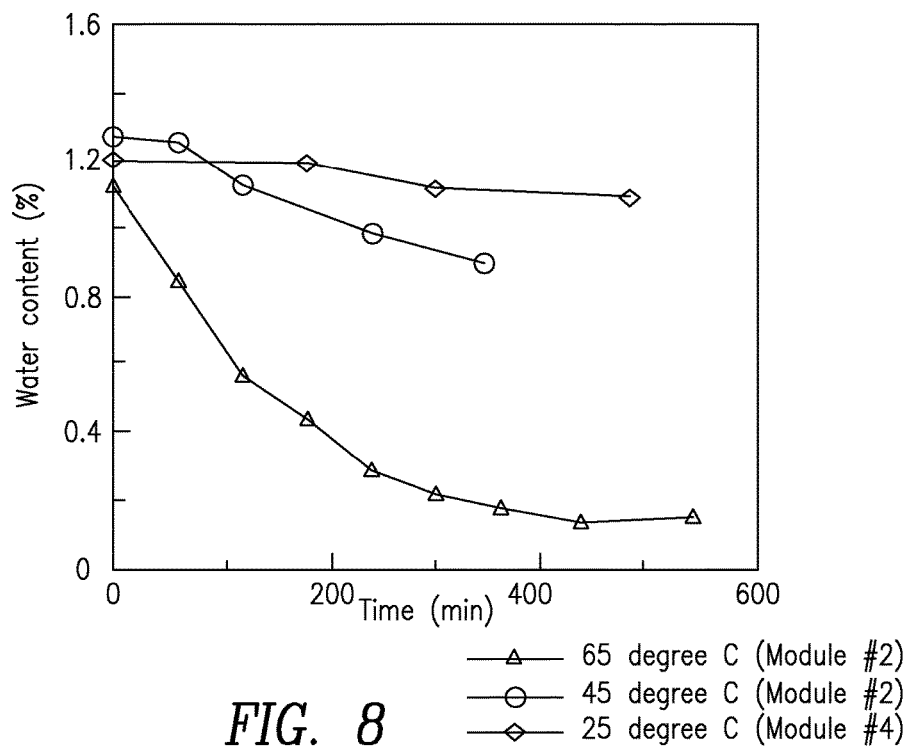
FIG. 8 is a graph of effect of temperature on water removal rate for CTA membrane; $C_0$=1.1-1.3 wt %; Oil flow rate: 1.0-1.6 g/min; Air flow rate: 100 cm$^3$/min.

The effect of temperature on the water removal rate was investigated for embodiments of the present invention utilizing CA, CTA and RC membranes at 25° C., 45° C. and 65° C. and results are shown herein. The overall mass transfer coefficients for CA and RC membrane embodiments at 45° C. and 65° C. are listed in Tables 7 and 8 respectively. It is slightly higher at 65° C. than at 45° C. for both CA and RC membrane embodiments. Without being confined to a single theory, the decrease of oil and water viscosity, the reduced emulsion stability and the increase of water diffusivity with increasing temperature are likely to be responsible for the increase in the overall mass transfer coefficient. It should be noted that water removal rate at 25° C. is very slow and there is very little water removal even after running for 8 hrs for the CTA membrane embodiments with initial water content of around 1 wt % as shown in FIG. 8.

TABLE 7

Overall mass transfer coefficient of CA membrane (Module #5) at different temperatures

| T (° C.) | $K_f \times 10^5$ (cm/s) |
|---|---|
| 65 | 6.57 |
| 45 | 3.99 |

$C_0$ = 1.8-1.9 wt %; Oil flow rate: 1.35-1.60 g/min; Air flow rate: 100 cm³/min.

TABLE 8

Overall mass transfer coefficient of RC membrane (Module #6) at different temperatures

| T (° C.) | $K_f \times 10^5$ (cm/s) |
|---|---|
| 65 | 2.30 |
| 45 | 1.91 |

$C_0$ = 2.0 wt %; Oil flow rate: 1 g/min; Air flow rate: 100 cm³/min.

Figure 9:
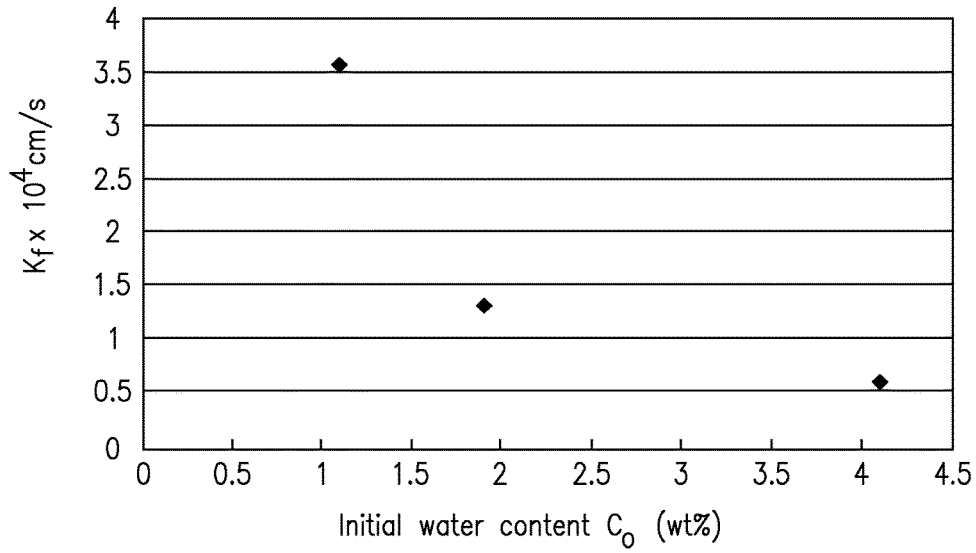
FIG. 9 is a graph of effect of initial water content on the overall mass transfer coefficient for CTA membrane (Modules #2 and #4); T=65.5° C.; Oil flow rate: 1.35-1.60 g/min; Air flow rate: 100 cm$^3$/min.

The effect of initial water phase content of the oil on the overall water mass transfer coefficient was investigated using an embodiment utilizing CTA membrane at 65° C. with an oil flow rate of 1.35-1.78 g/min. As shown in FIG. 9, the overall mass transfer coefficient decreased with increasing initial water phase content. This may be explained as follows: (1) for higher water content, the emulsion viscosity is higher; (2) as the water phase content increases, the accumulation of water droplets on the membrane surface especially the external tube sheet increases, resulting in an increase of external resistance.

Figure 10:
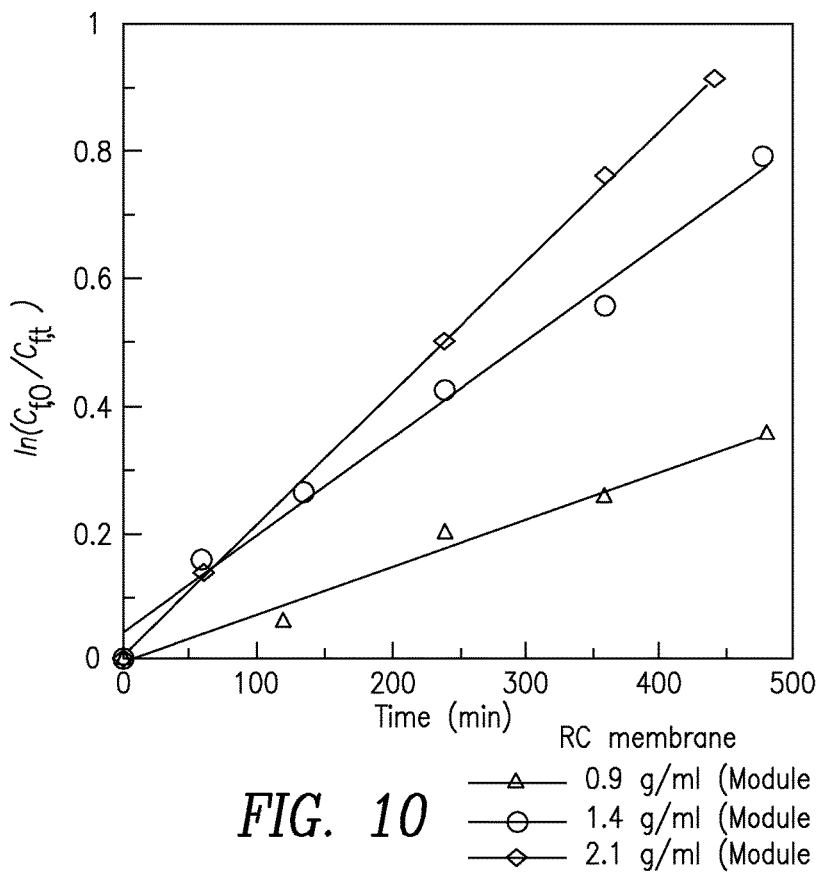
FIG. 10 is a graph of effect of oil flow rate on water removal rate for RC membrane (Modules #6 and #7); T=65.5° C.; $C_0$=2.0 wt %; Air flow rate: 100 cm$^3$/min.
Figure 11:
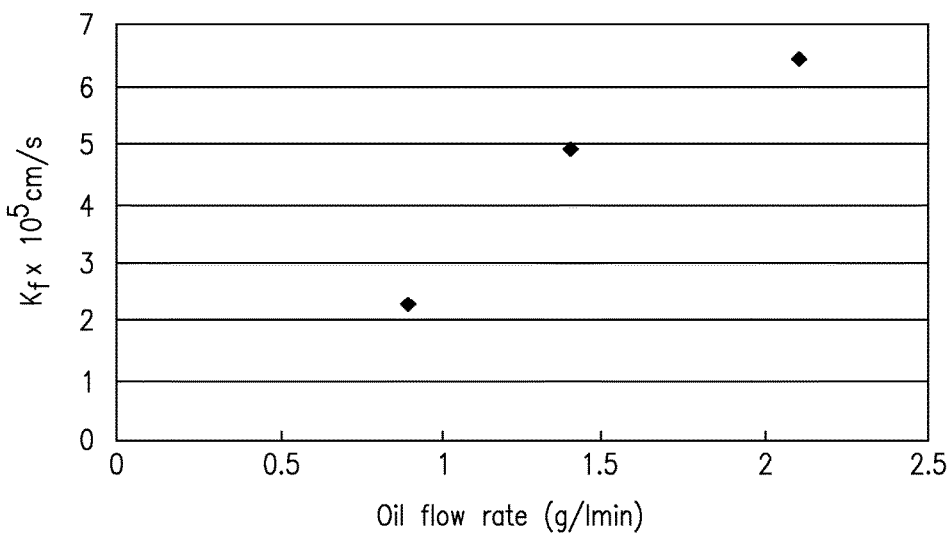
FIG. 11 is a graph of effect of oil flow rate on the overall mass transfer coefficient for RC membrane (Modules #6 and #7); T=65.5° C.; $C_0$=2.0 wt %; Air flow rate: 100 cm$^3$/min.

The effect of oil flow rate on the water removal rate was studied for embodiments of the present invention utilizing RC membranes at 65° C. with an initial water content of around 2 wt %. As shown in FIG. 10, the water removal rate increased with increasing oil flow rate, so did the overall mass transfer coefficient $K_f$ (as shown in FIG. 11). According to Eq. (6), the increase of oil flow rate results in an increase of liquid phase mass transfer coefficient $k_f$, which is responsible for the overall mass transfer coefficient increase.

As described in the mathematical model of the process, the overall mass transfer resistance includes the resistance to mass transfer in the liquid phase ($1/k_f$), the resistance to mass transfer in the membrane ($1/k_m$) and the resistance to mass transfer in the gas phase ($1/k_g$). Under the experimental conditions, the mass transfer in the gas phase is relatively fast and thus its resistance is considered negligible. The liquid mass transfer coefficient $k_f$ depends on the hydrodynamics of the feed, while the membrane mass transfer coefficient ($k_m$) is only related to the membrane properties and to the diffusion coefficient of water in membrane.

The liquid phase tube-side mass transfer coefficient $k_f$ was calculated based on Equations (12) and (13). Table 9 lists physicochemical data for one type of experimental oil used (SAE 5W30) motor oil used. The values of $k_f$ and $K_f$ for embodiments of the present invention utilizing RC membranes at 65° C. at various oil flow rates are listed in Table 10. The calculated liquid film mass transfer coefficient $k_f$ is of the same order as the overall mass transfer coefficient $K_f$, which indicates that the liquid phase resistance is a dominant factor in the overall mass transfer process. As described previously, for certain exemplary embodiments water removal rate is affected by different membrane types and it increased with increasing membrane pore diameter. Therefore, the mass transfer resistance is affected by both the liquid phase and the membrane.

TABLE 9

Properties of SAE 5W30 oil
SAE 5W30 lubricating oil

| Number of carbon range | 40-100 |
|---|---|
| Viscosity at 65° c., cp | 23.4 |
| Viscosity at 45° c., cp | 60 |

TABLE 10

Values of $K_f$ and $k_f$ for RC membrane at various oil flow rates (Modules #6 and #7)

| Oil flow rate (g/min) | $k_f \times 10^5$ (cm/s) | $K_f \times 10^5$ (cm/s) |
|---|---|---|
| 0.9 | 4.62 | 2.30 |
| 1.4 | 5.27 | 4.92 |
| 2.1 | 6.16 | 6.43 |

Operating temperature 65° C.

Figure 12:
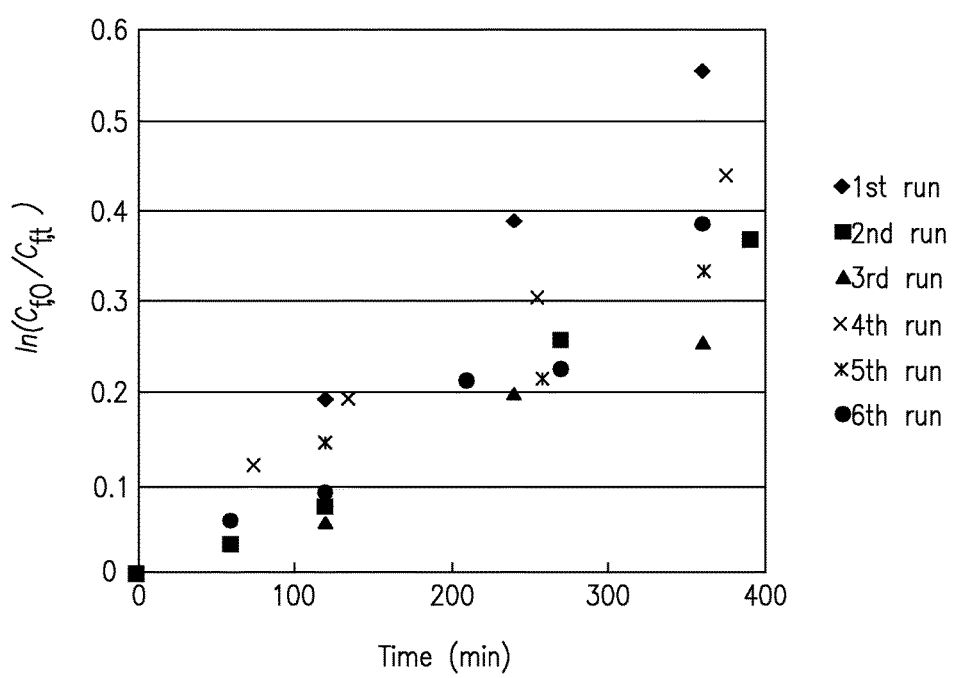
FIG. 12 is a graph of effect of runs on the water removal performance for RC membrane (Module #7); T=65.5° C.; $C_0$=2.1-2.3 wt %; Oil flow rate: 1.35 g/min; Air flow rate: 100 cm$^3$/min.

Partial wetting of the membrane with oil occurred for certain exemplary embodiments of the present invention utilizing CTA and CA membranes when operated at 65° C. Once said embodiments are wetted by the oil, the water removal performance is reduced substantially. CA membrane embodiments did not show any oil wetting when running at 25° C. for several weeks under an oil pressure up to 15 psi, while the oil wetting of the CA embodiments occurred after two days when operating at 65° C. The glass transition temperature of CA is 67-68° C. The plasticization of the CA membrane embodiments when operated at 65° C. might be responsible for the wetting of the membrane. CTA has a high glass transition temperature of 175-189° C., but the membrane used in certain experimental embodiments has a larger pore diameter, which tends to be easily wetted by oil. RC is a gel membrane, which will shrink at a high temperature. It has no pore strictly speaking since it is a water based gel; further, the glass transition temperature for RC is high (at least 150° C.). With all these properties, the RC membrane embodiments showed no wetting by the oil. One RC membrane embodiments was tested for six runs under the same experimental conditions ($C_0$ of around 2.2 wt %, T=65.5° C., oil flow rate=1.35 g/min); no oil was detected from the shell side of the membrane for said embodiment. As shown in FIG. 12, the overall mass transfer coefficient for said embodiment decreased with runs, indicating membrane fouling by the oil emulsion. A significant amount of fouling must have also come about from the collection of droplets at the hollow fiber tube sheet inlet.

Figure 13:
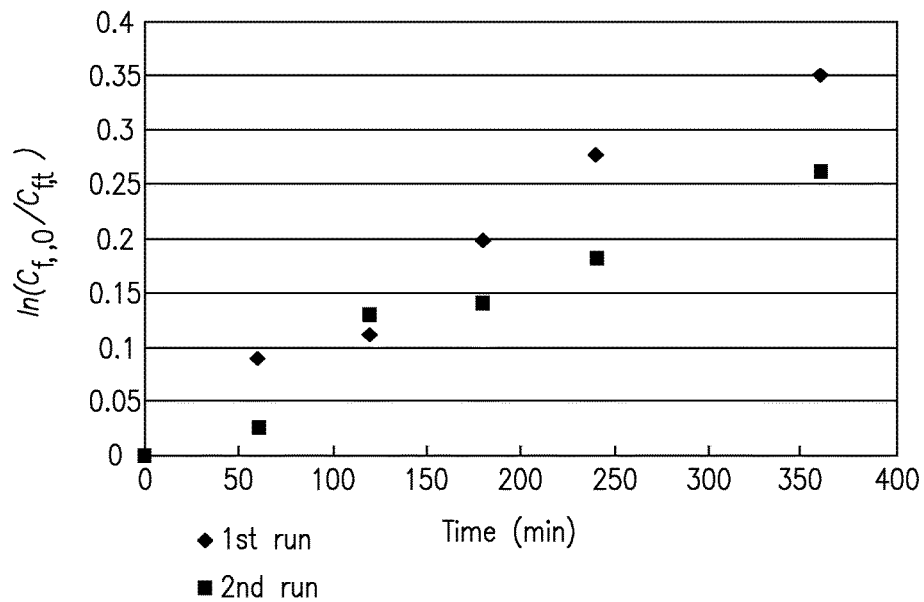
FIG. 13 is a graph of effect of run time on water removal performance for RC membrane (Module #7); T=80° C.; $C_0$=2.1 wt %; Oil flow rate: 0.86 g/min; Air flow rate: 100 cm$^3$/min.
Figure 14:
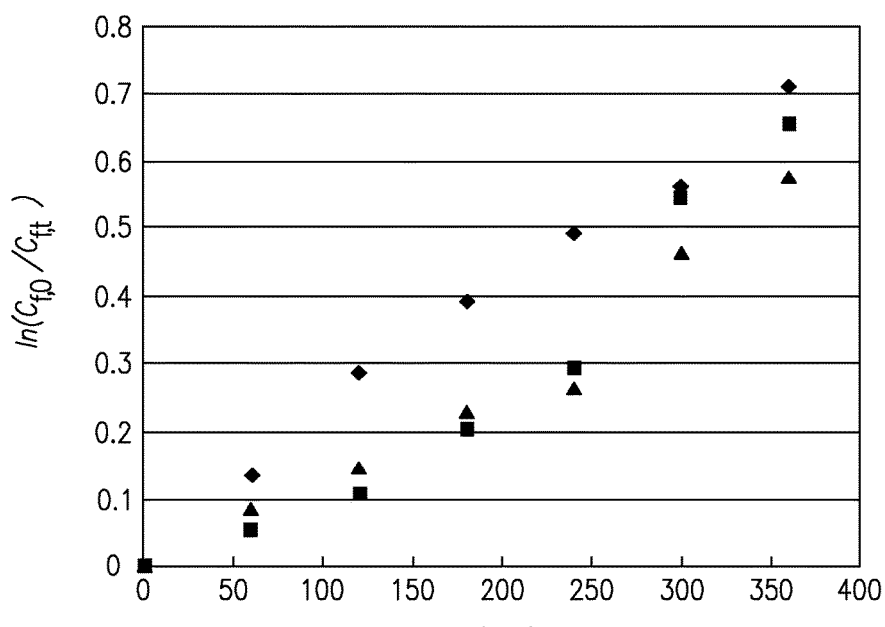
FIG. 14 is a graph of effect of run time on water removal performance for RC membrane (Module #7) after cleaning by hexane; T=80° C.; $C_0$=2.3 wt %; Oil flow rate 0.98 g/min; Air flow rate: 100 cm$^3$/min.

The RC membrane of said embodiment was tested then at 80° C. under the same experimental conditions ($C_0$ of around 2.1 wt %, oil flow rate=0.86 g/min) where the other membranes leaked; no oil was detected from the shell side of the membrane. As shown in FIG. 13, the overall $H_2O$ mass transfer coefficient value was estimated to be $2.20 \times 10^{-5}$ cm/s. It is somewhat lower compared with the results from the experiments at 65.5° C. due to membrane fouling by the oil emulsion. Module 7 was cleaned with hexane and tested again at 80° C. The results are indicated in FIG. 14; the overall $H_2O$ mass transfer coefficient value was $5.3 \times 10^{-5}$ cm/s.

Figure 15:
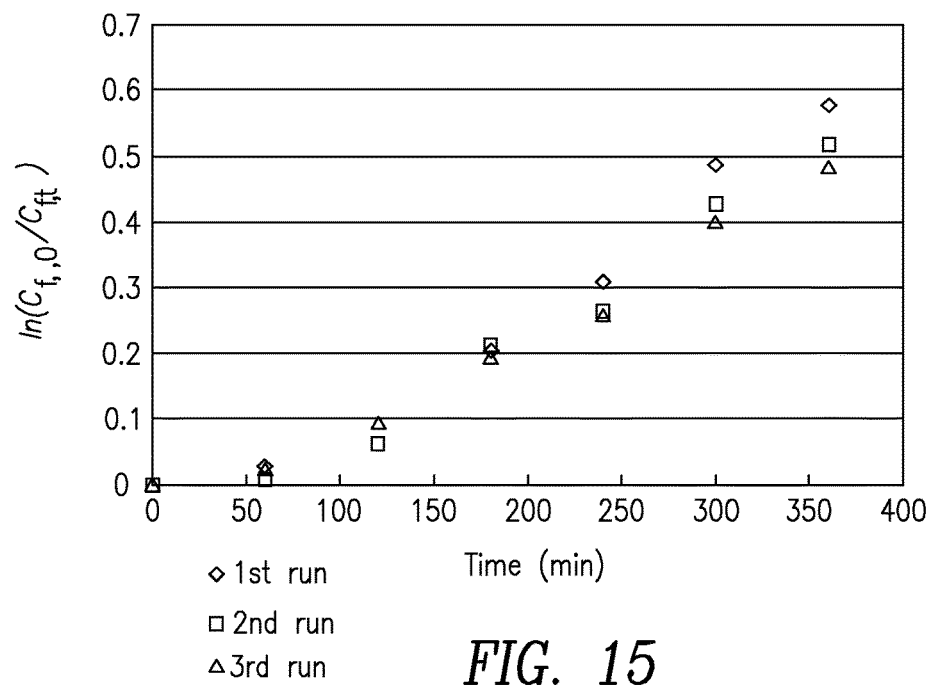
FIG. 15 is a graph of effect of run time on water removal performance for RC membrane (Module #7) for a colder starting ramp temperature; starting at −10° C. for 1 hour, then raised temperature as fast as possible to 65° C. and kept at that temperature for at least 5 hours; $C_0$=2.1 wt %; Oil flow rate: 0.98 g/min; Air flow rate: 100 cm$^3$/min.
Figure 16:
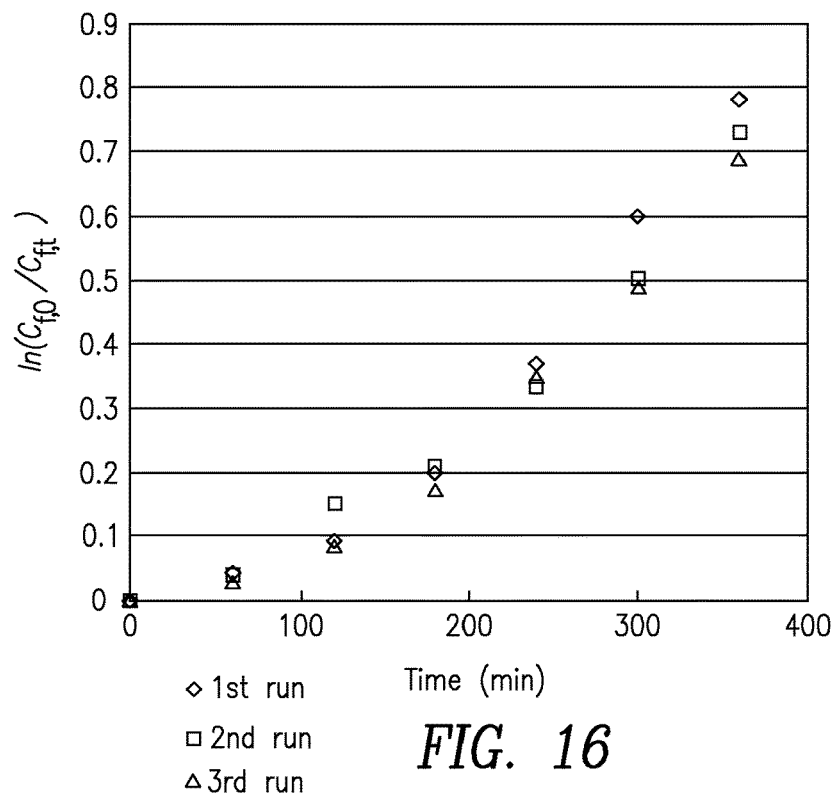
FIG. 16 is a graph of effect of run time on water removal performance for RC membrane (Module #7) for a warmer starting ramp temperature; starting at 22° C. for 1 hour, then raised temperature as fast as possible to 80° C. and kept at that temperature for at least 5 hours; $C_0$=2.1 wt %; Oil flow rate: 0.98 g/min; Air flow rate: 100 cm$^3$/min.

One embodiment of the present invention was tested with two different temperature programs. For the cold weather, the initial condition of cold temperature was started at $-10°$ C. for 1 hour, then raised to 65° C. as fast as possible and kept at that temperature for at least 5 hours. The warmer ramp temperature condition was started at 22° C. for 1 hour, then raised to 80° C. as fast as possible and kept at that temperature for at least 5 hours. The results are illustrated in FIGS. 15 and 16. The overall $H_2O$ mass transfer coefficient value from the cold ramp temperatures was estimated to be $4.50 \times 10^{-5}$ cm/s. For the warmer ramp temperatures, a value of $5.67 \times 10^{-5}$ cm/s was obtained for the overall $H_2O$ mass transfer coefficient. The temperature ramping achieved in the bath used was unfortunately quite slow even though it was programmed to change quite rapidly.

Figure 17:
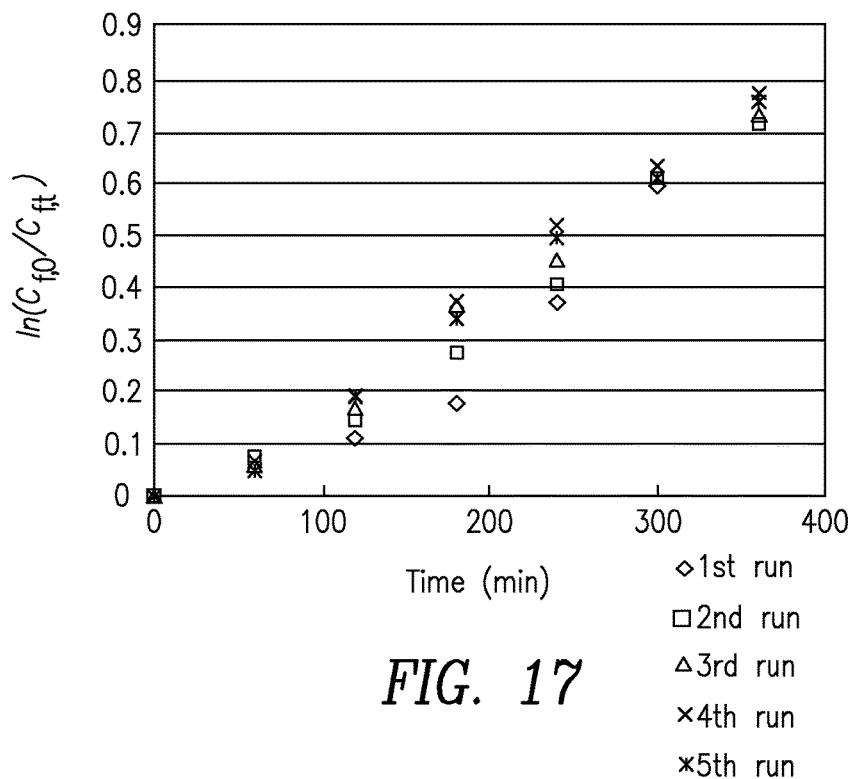
FIG. 17 is a graph of effect of run time on water removal performance for cross flow module containing RC hollow fiber membrane (Module #8); T=65° C.; $C_0$=2.1 wt %; Oil flow rate 1.4 g/min; Air flow rate: 100 cm$^3$/min.

The embodiment described as cross flow module #8 (Table 3) containing 300 RC hollow fibers each 16 cm long was tested at 65° C. The water removal performance encountered very little change with the number of runs as shown in FIG. 17. It appears that said embodiment as well as other embodiments utilizing crossflow improves the stability of performance by eliminating the fouling from oil emulsion. Further, the pressure drop encountered by the oil along the membrane was very little, the flow cross-sectional area being much larger; therefore a much higher feed flow rate can be used in the cross flow module raising the mass transfer coefficient substantially. The overall water mass transfer coefficient value was $7.0 \times 10^{-5}$ cm/s which is significantly higher than the value from parallel flow modules (see FIG. 11).

Figure 18:
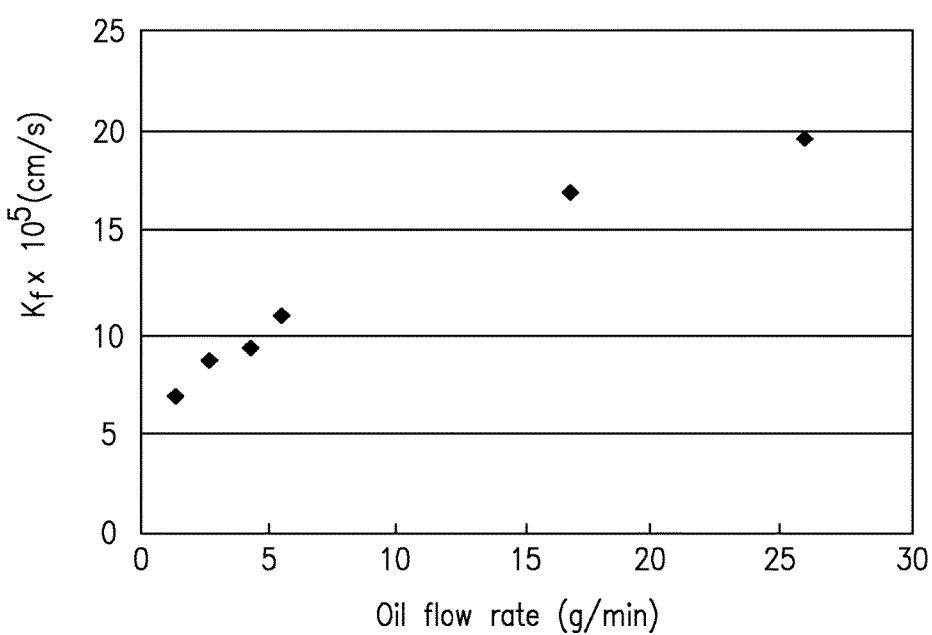
FIG. 18 is a graph of effect of flow rate on the overall mass transfer coefficient for RC cross flow membrane module (Module #8); T=65° C.; $C_0$=2.1 wt %; Air flow rate: 100 cm$^3$/min.

FIG. 18 illustrates the latest data acquired where oil flow rate was increased up to 25.9 cm$^3$/min. Calculations show that the highest oil mass transfer coefficient obtained was $19.63 \times 10^{-5}$ cm/s; this value is a few times larger than that in the tube-side flow.

From the results of this experimental program, an embodiment including a small parallel flow membrane module containing 300 fibers easily succeeded in removing greater than 90% of the water in 6 hours from a reservoir containing around 500 cm$^3$ of the engine oil in which about 1% of water was dispersed/dissolved. However, the oil flow rate was around 1-1.6 g/min. In one exemplary embodiment having 15000 hollow fibers, the membrane unit has 50 times greater water removal capacity. Therefore a small part of the engine oil circulated through this large 15000-fiber module embodiment is able to remove most of the water in the engine oil (4 quarts volume) in 30 minutes to 1 hour. There is no limit to the number of fibers that a membrane unit could include in either the parallel or cross-flow orientation. The size of the membrane would be dependent on both the amount of oil in the reservoir as well as the amount of water emulsified in said oil. Fiber numbers at or even orders of magnitude greater than 100,000 fibers per module depending on the size of the machine engine to be demulsified are embraced. Also fiber length may be increased or decreased by an order of magnitude from the experimental embodiments depending on the size of engine/machine requiring treatment. The overall measure of surface area of membrane unit would be entirely dependent on the size of machine and the amount of oil to be processed which would increase the range of values for any item having an effect on the overall surface area of the system to a large range.

In an embodiment of a small cross flow module (for example as shown schematically in FIG. 4), the engine oil flows on the outside of the hollow fibers membranes (16 cm long) in cross flow and drastically increases the water removal rate since the mass transfer coefficient can be increased by as much as four times. Such a device will reduce potentially the number of hollow fiber membranes needed in a large module to for example 5000 fibers in a 2.5 inch diameter module for actual application in an automobile. If the fibers are 25.4 cm long, the number of fibers would be reduced to 3000 resulting in a module of around 1.5 inch diameter in an automobile. Further embodiments could embody a myriad of other fiber length and number scenarios depending on the size of machine and amount of dissolved water.

The small amount of water present in an emulsion in the engine oil can be successfully removed by hollow fiber hydrogel membranes such as regenerated cellulose (RC) or other hydrophilic hollow fibers such as cellulose acetate (CA) or cellulose triacetate (CTA). The water removal rates for experimental embodiments tested are in the order of CTA>CA>RC.

The water removal performance was increased at higher operating temperatures and increasing oil flow rate; however, higher oil flow rate through the fiber bore can increase the pressure drop along embodiments involving the RC membrane modules which may be deleterious for membrane stability. In the parallel flow module embodiments, the water removal performance declined slowly after repeated runs due to membrane fouling by the oil emulsion. This problem was overcome and water mass transfer coefficient improved drastically by using a cross flow module. The cross flow module embodiment containing RC hollow fiber membrane demonstrated excellent water removal performance; the overall mass transfer coefficient value observed was $7.0 \times 10^{-5}$ at 65° C. at oil flow rate used with parallel flow modules. When a much higher oil flow rate (25.9 cm$^3$/min) was used, the value of K was increased to $19.63 \times 10^{-5}$ cm/s at 65° C. which is about four times that achieved with a parallel flow membrane.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

This application incorporates by reference United State Provisional Patent Application Ser. No. 61/433,059, filed Jan. 14, 2011, and all references cited herein, in their entirety.

APPENDIX

Notation

A effective surface area of the membrane based on I.D. (cm$^2$)
C water concentration in oil
$d_i$ diameter of the fiber (cm)
$D_{AB}$ mutual diffusion coefficient of solute A at very low concentration in solvent B, cm$^2$/s
$D_f$ diffusion coefficient in the liquid phase (cm$^2$/s)
$k_f$ feed side mass transfer coefficient (cm/s)
$k_m$ membrane transfer coefficient (cm/s)
$k_g$ gas phase mass transfer coefficient (cm/s)
$K_f$ overall mass transfer coefficient (cm/s)
L length of the fiber (cm)
$M_B$ molecular weight of solvent B, g/mol
N water flux per unit area
Q feed flow rate (cm$^3$/min)
T temperature (K)
$V_A$ molecular volume of solute A at its normal boiling temperature, cm$^3$/mol
V tank volume (cm$^3$)
Greek Letters
$\eta_B$ viscosity of solvent B, cP
v liquid flow velocity (cm/s)
$\phi$ association factor of solvent B, dimensionless
Subscripts
f feed solution
$f_i$ feed-membrane interface
$g_i$ membrane-gas interface
g gas phase
m membrane
Superscripts
M module
T tank

What is claimed is:

1. An oil circulation system for continuously purifying engine oil comprising an engine operably connected to an oil reservoir, wherein at least one stream of oil is conveyed from the oil reservoir to the engine via a conduit, and circulated through the engine and conduit via engine operating pressure and/or one or more pumps, and at least one membrane unit positioned in a path of the oil stream such that oil containing dissolved/emulsified droplets of water is fed continuously through the membrane unit wherein the membrane unit comprises a cross-flow membrane module comprising a central feed distributor tube positioned to receive the at least one stream of oil, a plurality of hydrogel hollow fiber membranes positioned around the central feed distributor tube, and ports for receiving and emitting a flow of sweep air wherein the central feed distributor tube includes openings sized and positioned to allow oil flowing therethrough to exit and contact outside surfaces of the hydrogel hollow fiber membranes, and wherein the flow of sweep air is through respective bores of the hydrogel hollow fiber membranes.

2. The system according to claim 1 wherein the membrane unit is located in a direct path of oil circulation.

3. The system according to claim 1 further comprising an air supply for introducing sweep air into a bore of the hollow fiber membranes to remove permeated water vapor.

4. The system according to claim 1 wherein the membrane unit comprises from about 100 to about 1,000 hollow fiber membranes, the fibers having a length of from about 1 to about 20 inches.

5. A cross flow hollow fiber module adapted to be positioned in a system for continuously purifying engine oil, the hollow fiber module comprising a central feed distributor tube, a plurality of hollow fiber hydrogel membranes positioned around the central feed distributor tube, ports for receiving and emitting a flow of sweep air, and optionally a shell casing, wherein the central feed distributor tube includes openings sized and positioned to allow oil flowing into the feed distributor tube to flow out radially.

* * * * *